July 21, 1959    A. V. LEMONS    2,895,156
PIPE WIPER AND HOUSING THEREFOR
Filed Aug. 4, 1958    2 Sheets-Sheet 1
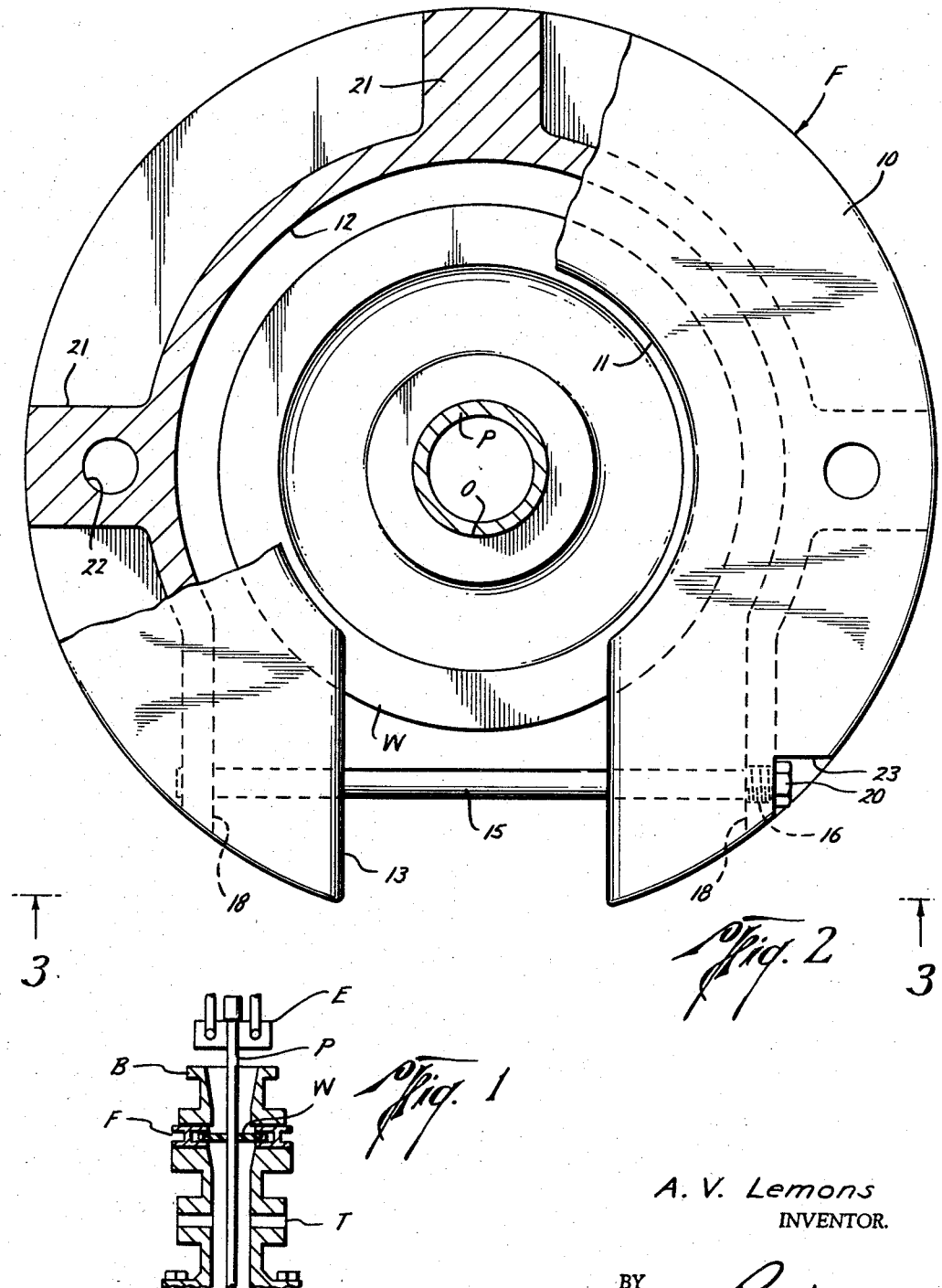
A. V. Lemons
INVENTOR.
BY
ATTORNEY

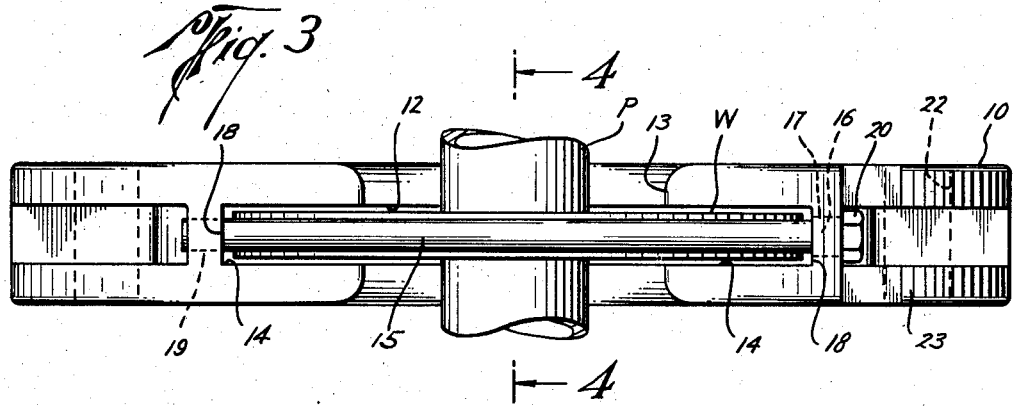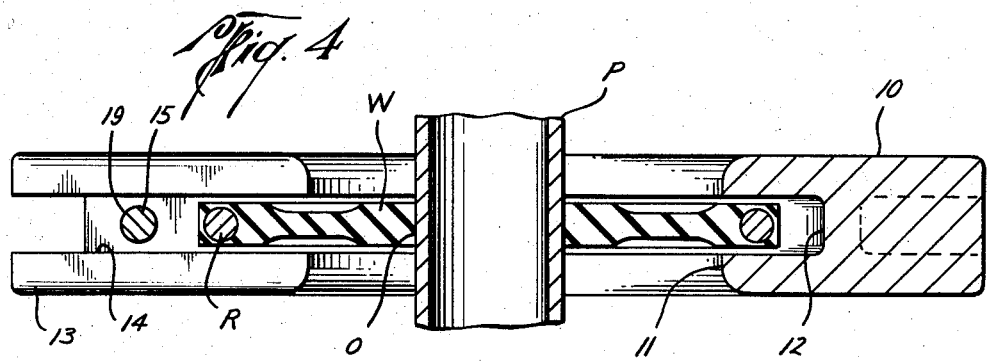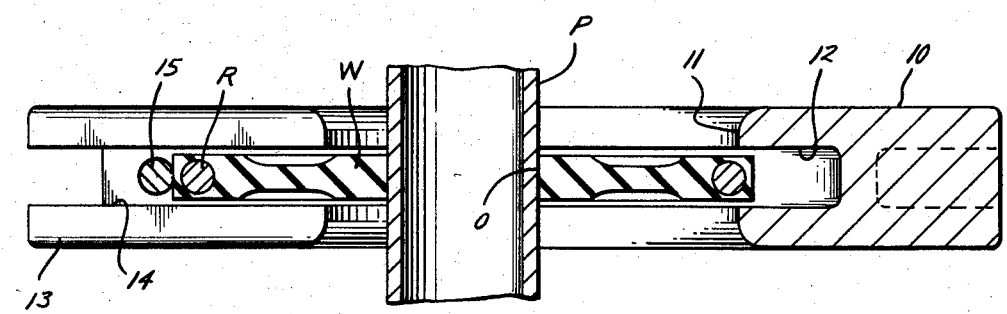

United States Patent Office 2,895,156
Patented July 21, 1959

2,895,156

PIPE WIPER AND HOUSING THEREFOR

A. V. Lemons, Pasadena, Tex., assignor to Petroleum Mechanical Development Company, Houston, Tex., a corporation of Texas Application August 4, 1958, Serial No. 752,841

8 Claims. (Cl. 15—210)

This invention relates to a housing for pipe wipers employed in connection with the running of pipe in wells, such as oil and gas wells.

Pipe wipers, as well understood in the oil industry, ordinarily comprise circular disk-shaped bodies constructed of flexible resilient material, such as rubber, and having a central opening through which pipe string is drawn from the well, the opening being flexibly distendible and of a size to wipingly engage the exterior of the pipe string to wipe therefrom mud, wax, oil, and other material clinging to the pipe as it is withdrawn from the well. These wipers are ordinarily secured between fittings constituting the wellhead.

The present invention is directed to a form of housing to receive the pipe wiper and forming a support therefor which can be laterally installed about or removed from the pipe string while leaving the wiper in position about the pipe between the wellhead fittings.

The housing in accordance with this invention is commonly termed a "flange" and comprises an annular body having a central bore which is provided with a circumferential recess in the bore wall for receiving the peripheral portion of the pipe wiper to support the same in bore-closing position. The recess has a diameter somewhat larger than that of the pipe wiper to permit the latter to engage in a limited amount of lateral movement in response to the swaying of the pipe as it is drawn upwardly from the well, without displacing the wiper from the housing, the bore diameter of the body being less than the diameter of the wiper. The housing is provided with a radial slot communicating with the recess through which the wiper may be slidably introduced into the body and seated in the recess. Removable keeper means are provided for closing the slot against displacement of the wiper therefrom. The housing or flange thus acts as a strong support for the wiper and when the latter is in position in the housing, the bore of the housing will be closed about the pipe and will prevent junk, loose tools, or other foreign items from falling into the well bore with consequent difficulty frequently encountered when this occurs.

Other and more specific objects and advantages of this invention will become apparent from the following detailed description when read in conjunction with the accompanying drawing which illustrates an embodiment of this invention.

In the drawing:

Fig. 1 is a somewhat diagrammatic longitudinal sectional view of a conventional wellhead structure, showing the pipe wiper housing, in accordance with this invention, disposed therein;

Fig. 2 is a plan view, partly in section, of the pipe wiper housing, in accordance with this invention, showing a pipe wiper in place therein;

Fig. 3 is an elevational view looking toward the pipe wiper housing, generally along line 3—3 of Fig. 2;

Fig. 4 is a vertical, cross-sectional view taken along line 4—4 of Fig. 3; and

Fig. 5 is a view similar to Fig. 4, showing the wiper element shifted laterally to accommodate corresponding movement of the pipe being drawn therethrough.

Referring to the drawing, Fig. 1 shows a conventional tubing head T supported in the usual manner on a casinghead (not shown), and a string of pipe P being drawn therethrough by means of the conventional elevators E. Slip bowl B, also of well-known design, is conventionally mounted on top of the tubing head in order to support the slips (not shown) which are used for gripping the pipe while sections thereof are being broken out as the pipe is being withdrawn from the well. A pipe wiper flange F, in accordance with the present invention, is shown mounted over the well between tubing head T and the slip bowl B, and has mounted therein a pipe wiper W which is adapted to wipingly engage pipe P in order to clean the same of oil, mud, and the like, which normally is carried up by the pipe as it is withdrawn from the well.

Referring now to Figs. 2 to 5, inclusive, the pipe wiper flange F comprises a body 10, of generally circular form, constructed of steel or like strong rigid material, and having a substantially flat, thin shape, that is, having an axial length or thickness which is quite short as compared with the diameter of the flange. Body 10 has an axial bore 11 which is substantially larger in diameter than that of any pipe strings which are expected to be drawn therethrough. The wall of bore 11 is provided with a circumferential recess 12 adapted to receive the peripheral portion of pipe wiper W. Wiper W is of conventional flat disk-shaped form, having an axial bore O dimensioned to fit closely about the exterior of pipe P, which is to be drawn therethrough. The outer periphery of wiper W is re-enforced by a metal ring R, which is molded in the flexible resilient material, such as rubber, which comprises the body of wiper W. The latter has sufficient flexibility to allow bore O to be distended so that enlargements, such as collars or up-set portions on the pipe strings, may be drawn therethrough while maintaining close wiping engagement with the exterior of the pipe.

Recess 12 in the wall of bore 11 is made to have a diameter somewhat greater than the external diameter of wiper W in order that the latter may be permitted to shift laterally to a limited extent in the confines of the recess to accommodate the shifting or swaying of pipe P as the latter moves through bore 11. However, bore 11 has a diameter sufficiently less than the external diameter of wiper W so that the latter will, at all times, remain confined within recess 12 and will not be pulled through bore 11 by pipe P. The axial width of recess 12 is made slightly greater than the thickness of the peripheral portion of wiper W to allow for relatively free sliding movement of the wiper within recess 12.

A slot 13 extends radially through body 10 between bore 11 and the exterior of body 10. The width of slot 13 is such as will permit the body to be laterally installed about, or withdrawn from, pipe P. That is, the width of slot 13 will be made greater than the maximum diameter of any pipe which it is contemplated will be accommodated in body 10. The opposite walls of slot 13 are provided with longitudinally extending channels 14—14 which provide communication between recess 12 and the exterior of body 10. The distance between the walls 18—18 forming the bottoms of channels 14—14 is made slightly greater than the external diameter of wiper W so that the latter may be inserted freely into and out of recess 12 by sliding it through slot 13 and channels 14.

To retain wiper W in recess 12, suitable removable keeper means are provided for closing slot 13. Various means may be employed for this purpose. In the embodiment illustrated, the keeper means comprises a bolt or rod 15 which extends transversely of channels 14 and slot 13 at a point spaced radially outwardly from recess 12 and passes through registering openings in walls 18—18. Bolt 15 has a threaded section 16 adapted to be screwed into a suitable threaded opening 17 provided in one of the walls 18, and extends across slot 13, and through a suitable registering opening 19 provided in the opposite side wall 18, bolt 15 having a head 20 which engages against the exterior of wall 18. The outer periphery of the body is notched at 23 to accommodate a bolt head 20. The outer periphery of body 10 is cored or otherwise formed to provide a plurality of angularly spaced, radially extending ribs 21, some of which may be provided with vertical openings 22 for the reception of bolts or other means by which body 10 may be effectively secured to the wellhead fittings between which it is mounted.

In operation, pipe wiper W will normally be mounted over the end of the pipe string being run from the well and will be inserted laterally through slot 13 and channels 14 into housing 10. Bolt 15 will be put in place to secure the wiper in the housing. The housing containing the wiper will then be positioned on top of the tubing head T and slip bowl B will be installed over the end of the pipe and secured to tubing head T in any suitable manner so as to effectively clamp or otherwise secure the housing between these fittings.

Pipe P may then be withdrawn through the pipe wiper, which will perform its usual wiping and cleaning functions as the pipe string is withdrawn, and by being enclosed in body 10 the pipe wiper will also close the bore of the fittings against tools, and the like, falling into the well bore through the wellhead fittings. The difference in dimensions between recess 12 and pipe wiper W will permit the latter to shift laterally as pipe P sways from side to side during its movement through the wellhead, without dislodgment of the wiper from the housing.

When the pipe is out of the well, bolt 15 may be withdrawn, pipe wiper W removed, and a blind flange or other type of closure plate may be inserted through slot 13 and channel 14 to close bore 11 and thereby prevent objects from falling into the bore of the well while the pipe is out of the well.

By way of example of the relative dimensions of the parts of the structure, when a conventional 9 inch pipe wiper is to be employed, a pipe wiper flange or housing in accordance with this invention, will be employed having the following dimensions: bore 11—diameter 7 1/16 inches; the diameter of recess 12 will be 10½ inches; the width of slot 13 will be 4⅝ inches; the width between walls 18 of channel 14 will be about 9½ inches; outside diameter of body 10, about 15½ inches; and thickness of body 10, about 2 inches.

It will be understood that the several dimensions referred to may be varied to accommodate wipers of different sizes.

It will be understood also that various alterations and modifications may be made in the details of the illustrative embodiment within the scope of the appended claims, but without departing from the spirit of this invention.

What I claim and desire to secure by Letters Patent is:

1. A pipe wiper housing for use with a substantially flat annular pipe wiper, comprising, a rigid substantially flat one-piece annular body adapted to be positioned over a well and having a central bore adapted for passage therethrough of pipe strings into and out of the well, a circumferential recess in the wall of said bore adapted to receive the outer peripheral portion of an annular pipe wiper and to support the wiper in position to close said bore about a pipe extending therethrough, a radial slot through said body extending between said bore and the exterior of said body through which the pipe wiper may be inserted and removed from said body, the width of said slot being such as to permit the body to be laterally installed about and removed from the pipe, and removable keeper means closing said slot.

2. A pipe wiper housing for use with a substantially flat annular pipe wiper, comprising, a rigid substantially flat one-piece annular body adapted to be positioned over a well and having a central bore adapted for passage therethrough of pipe strings into and out of the well, a circumferential recess in the wall of said bore adapted to receive an annular pipe wiper and to support the latter in position to close said bore about a pipe extending therethrough, the diameter of said recess being somewhat greater than that of the pipe wiper and the diameter of said bore being less than that of the pipe wiper, a radial slot through said body extending between said bore and the exterior of said body through which the pipe wiper may be inserted and removed from said body, the width of said slot being such as to permit the body to be laterally installed about and removed from the pipe, and removable keeper means closing said slot.

3. A pipe wiper housing for use with a substantially flat annular pipe wiper, comprising, a rigid substantially flat one-piece annular body adapted to be positioned over a well and having a central bore adapted for passage therethrough of pipe strings into and out of the well, a circumferential recess in the wall of said bore adapted to receive the outer peripheral portion of an annular pipe wiper and to support the wiper in position to close said bore about a pipe extending therethrough, the diameter of said recess being sufficiently larger than that of said pipe wiper to permit an appreciable degree of lateral shifting of the pipe wiper while retaining the latter within the confines of the recess, a radial slot through said body extending between said bore and the exterior of said body through which the pipe wiper may be inserted and removed from said body, the width of said slot being such as to permit the body to be laterally installed about and removed from the pipe, and removable keeper means closing said slot.

4. A pipe wiper housing for use with a substantially flat annular pipe wiper, comprising, a rigid substantially flat one-piece annular body adapted to be positioned over a well and having a central bore adapted for passage therethrough of pipe strings into and out of the well, a circumferential recess in the wall of said bore adapted to receive the outer peripheral portion of a circular pipe wiper and to support the wiper in position to close said bore about a pipe extending therethrough, a radial slot through said body extending between said bore and the exterior of said body, the width of said slot being such as to permit the body to be laterally installed about and removed from the pipe, longitudinal channels in the opposite walls of said slot communicating with said recess constructed and arranged to allow insertion into and removal from said recess of said pipe wiper, and removable keeper means closing said slot.

5. A pipe wiper housing for use with a substantially flat annular pipe wiper, comprising, a rigid substantially flat one-piece annular body adapted to be positioned over a well and having a central bore adapted for passage therethrough of pipe strings into and out of the well, a circumferential recess in the wall of said bore adapted to receive the outer peripheral portion of a circular pipe wiper and to support the wiper in position to close said bore about a pipe extending therethrough, the diameter of said recess being somewhat greater than that of the pipe wiper and the dameter of said bore being less than that of the pipe wiper, a radial slot through said body extending between said bore and the exterior of said body, the width of said slot being such as to permit the body to be laterally installed about and removed from the pipe, longitudinal channels in the opposite walls of said slot communicating with said recess constructed and arranged to allow insertion into and removal from said recess of said pipe wiper, and removable keeper means closing said slot.

6. A pipe wiper housing for use with a substantially flat annular pipe wiper, comprising, a rigid substantially flat one-piece annular body adapted to be positioned over a well and having a central bore adapted for passage therethrough of pipe strings into and out of the well, a circumferential recess in the wall of said bore adapted to receive the outer peripheral portion of an annular pipe wiper and to support the wiper in position to close said bore about a pipe extending therethrough, a radial slot through said body extending between said bore and the exterior of said body through which the pipe wiper may be inserted and removed from said body, the width of said slot being such as to permit the body to be laterally installed about and removed from the pipe, and removable keeper means closing said slot, said keeper means comprising a bolt extending transversely of said slot at a point spaced radially outwardly from said bore.

7. In combination, a substantially flat, circular pipe wiper, and a support for said wiper, said support comprising, a rigid substantially flat one-piece annular body having an axial bore smaller in diameter than said wiper, a circumferential recess in the wall of said bore adapted to supportingly receive the peripheral portion of said wiper, a radial slot through the wall of the body through which the pipe wiper may be inserted into and removed from said recess, and removable keeper means closing said slot.

8. A support for a substantially flat circular pipe wiper, comprising, a rigid substantially flat one-piece annular body having an axial bore smaller in diameter than a pipe wiper to be accommodated by said support, a circumferential recess in the wall of said bore somewhat greater in diameter than said wiper defining a supporting seat for said wiper, a radial slot through the wall of the body through which the wiper may be slidably inserted into and removed from said recess transversely to the axis of said bore, and removable keeper means closing said slot.

References Cited in the file of this patent

UNITED STATES PATENTS

| | | |
|---|---|---|
| 2,285,742 | Miller | June 9, 1942 |
| 2,548,127 | Slavens | Apr. 10, 1951 |